(12) United States Patent
Fowler et al.

(10) Patent No.: US 10,906,111 B2
(45) Date of Patent: Feb. 2, 2021

(54) METHOD OF USING A CUTTING BLADE

(71) Applicant: THE M. K. MORSE COMPANY, Canton, OH (US)

(72) Inventors: Andrew Fowler, Massillon, OH (US); Charles Davis Burkhart, Canton, OH (US)

(73) Assignee: The M.K. Morse Company, Canton, OH (US)

( * ) Notice: Subject to any disclaimer, the term of this patent is extended or adjusted under 35 U.S.C. 154(b) by 0 days.

(21) Appl. No.: 15/688,001

(22) Filed: Aug. 28, 2017

(65) Prior Publication Data

US 2017/0355030 A1     Dec. 14, 2017

Related U.S. Application Data

(63) Continuation-in-part of application No. 14/337,543, filed on Jul. 22, 2014, now abandoned.

(60) Provisional application No. 61/859,475, filed on Jul. 29, 2013.

(51) Int. Cl.
    *B23D 61/12*    (2006.01)
    *B23D 61/18*    (2006.01)
    *B27B 33/06*    (2006.01)

(52) U.S. Cl.
    CPC ......... *B23D 61/121* (2013.01); *B23D 61/123* (2013.01); *B23D 61/18* (2013.01); *B27B 33/06* (2013.01); *Y10T 83/04* (2015.04)

(58) Field of Classification Search
    CPC .... B23D 61/121; B23D 61/123; B23D 61/18; Y10T 83/9317; Y10T 83/9321; Y10T 83/9346; Y10T 83/935; Y10T 83/9353; Y10T 83/9355; B27B 33/06
    See application file for complete search history.

(56) References Cited

U.S. PATENT DOCUMENTS

| | | | | |
|---|---|---|---|---|
| 1,381,930 A | * | 6/1921 | Morgan | B23D 61/121 83/851 |
| 2,071,618 A | * | 2/1937 | Ferrarl | B23D 61/121 144/376 |
| 3,259,004 A | * | 7/1966 | Chisholm | B26F 3/06 83/171 |
| 3,508,590 A | * | 4/1970 | Sprague Sr. | B27B 13/04 83/419 |
| 4,292,871 A | * | 10/1981 | Neumeyer | B23D 61/12 76/112 |
| 6,167,792 B1 | | 1/2001 | Korb et al. | |
| 6,276,248 B1 | | 8/2001 | Cranna | |
| 6,601,495 B2 | | 8/2003 | Cranna | |
| 7,036,415 B2 | | 5/2006 | Tsujimoto | |
| 7,174,823 B2 | | 2/2007 | Cranna | |
| 9,731,365 B2 | | 8/2017 | Cranna | |

(Continued)

*Primary Examiner* — Stephen Choi
(74) *Attorney, Agent, or Firm* — Black, McCuskey, Souers & Arbaugh LPA (57) ABSTRACT

A method of using a cutting blade on a portable band saw. The method includes the step of providing a portable band saw. A cutting blade is provided which includes at least one tooth that has a linear rake face with a positive rake face angle transitioning uninterruptedly from a tip of said cutting tooth into a single radius to define a portion of said cutting tooth. The portable band saw is used to cut and object with the cutting blade of the portable band saw in a single continuous linear cut direction.

3 Claims, 6 Drawing Sheets

(56) References Cited

U.S. PATENT DOCUMENTS

| | | | |
|---|---|---|---|
| 2008/0121084 A1* | 5/2008 | Vogel | B23D 61/12 83/835 |
| 2013/0180375 A1 | 7/2013 | Rearick et al. | |

* cited by examiner

METHOD OF USING A CUTTING BLADE

CROSS-REFERENCE TO RELATED APPLICATION

This non-provisional application is a continuation-in-part of U.S. application Ser. No. 14/337,543, filed on Jul. 22, 2014, which claims the benefit of U.S. Provisional Patent Application Ser. No. 61/859,475, filed on Jul. 29, 2013

BACKGROUND OF THE INVENTION

Technical Field

The invention relates generally to the use of portable cutting devices. More particularly, the invention relates generally to the art of using a portable cutting apparatus that includes a cutting blade with a cutting edge, and in particular, to a cutting blade used to cut various materials. More specifically, the invention is directed to a method of using a cutting blade on a portable band saw to cut various materials in a single continuous linear cut direction.

Related Art

There are a number of portable cutting devices on the market today. For example, it is possible to purchase a portable miter saw, a portable hole saw, a portable band saw, a portable reciprocating saw blade, and a portable circular blade, among many other types of portable cutting devices. Each of the portable cutting devices is utilized for a specific purpose as required by the specific job. For example, a portable miter saw with a circular or reciprocating cutting blade would be utilized when a user is working with crown molding to cut precise 45 degree angles. Thus, a user may be required to have multiple portable cutting saws with circular or reciprocating cutting blades in order to complete a task on a job site. It is known that teeth of circular or reciprocating cutting blades have limited time in cutting engagement with an object workpiece.

In addition to having multiple saws for a job, a user may be required to have multiple saw blades for each saw to complete the job. For example, a user may need to change blades on a saw to cut different materials and/or provide replacement cutting blades depending on the job satisfactorily. In order to produce better various types of cutting blades, cutting blade manufacturers manipulate a number of characteristics for a cutting blade, or saw blade, including decreased cut time, durability or longer blade life, cleaner cuts of the material, and/or decreased vibration for the user. The cut time is the amount of time required to cut through the specific material. The durability, or blade life, is the amount of time that a blade is utilized without being replaced or sharpened. A clean cut is the smoothness of the area where the blade cuts through the material. The vibration a user feels during operation of the saw is from the interaction between the blade and the material that is being cut.

The structure of the cutting blade may be manipulated to affect the characteristics of the blade to achieve the aforementioned characteristics. Some structural adjustments to impact the cutting blade include altering the structure of the individual teeth and to increase the number of teeth within each inch of length of the blade.

By altering the structure of the individual teeth, the cutting blade may be better suited to cut different materials more efficiently. For example, by adjusting the tooth tip, the cutting blade may be best utilized for ripping, crosscutting, or laminates. In this manner, a cutting blade user can select the cutting blade that is most suited for the task.

Additionally, the tooth face or the surface of the tooth on which the chip is formed may be altered. For example, the tooth face may be widened thus increasing the surface area to strengthen the teeth of the cutting surface.

Further, the tooth rake angle or the angle of the tooth face measured with respect to a line perpendicular to the cutting direction of the saw may be increased or decreased. A cutting blade with a high positive tooth rake angle will have an aggressive cut and a fast feed rate. A low tooth rake angle will slow the feed rate and will inhibit the blade's tendency to "climb" the material being cut, but will increase the strength of the tooth by increasing the included angle of the tip of the tooth thus reducing tooth stripping.

By altering the physical structure of the individual cutting teeth, different cutting blades are available to users to complete a variety of tasks. Another way to alter the structure of the cutting blade is to increase or decrease the amount of cutting teeth in a predetermined area.

The number of teeth per inch ("TPI") may vary according to the work for which the blade is adapted and may vary from 3 to 21 teeth per inch. For use in general carpentry, about 5 to 8 teeth per inch is appropriate. For more intricate work, as many as 21 teeth per inch would be appropriate. Typically, the more teeth a saw blade has, the smoother the cut, but the cut time may be increased. The saw blade manufacturers must strike a balance among a smoother cut of the material, the amount of time needed to cut the material, the vibration from the saw, and the durability of the saw blade.

In order to help strike such a balance, saw blade manufacturers have manipulated the orientation of the teeth in various sets or patterns. One such tooth set pattern is the raker set. The raker set pattern is at least a three-tooth sequence in which the first tooth is neutral or in the plane of the body of the saw blade, with a second tooth offset to the right of the blade, and a third tooth offset to the left of the blade, with a repeating pattern or some combination thereof. One advantage of the raker set pattern is that it has been found to lengthen the usable saw blade life.

Another tooth set pattern is the wavy set. The wavy set pattern is a repeating tooth set pattern in which a group of teeth gradually transitions to an offset to the right of the saw blade and then back to center, and another group of teeth gradually transitions to an offset to the left of the saw blade and then back to center, thus giving the appearance of a wave when the saw blade is viewed from above. One advantage of the wavy set pattern is that it decreases cut time compared to a raker set pattern, but does not have as long of a usable life. Another advantage of the wavy set pattern is that it often engages the material better than a raker set pattern and causes less vibration while cutting the material and, in turn, reduces operator fatigue.

Prior art portable band saws generally are limited to a specific purpose and/or job and further requiring additional cutting blades as replacements. Generally, portable band saws have cutting blades that are thinner and/or finer tooth pitched blades than cutting blades for band saws that are anchored and/or stationary. In this manner, portable band saws with cutting blades are more susceptible to tooth stripping requiring blade replacement more frequently thus increasing costs.

The method of using the cutting blade of the present invention solves the problems associated with prior art cutting blades by providing a more robust cutting blade for a portable band saw that cuts in a single linear direction, reduces the frequency of tooth stripping, and minimizing replacement and/or maintenance of the cutting blade for a portable band saw. Further, the method of using the cutting blade of the present invention further facilitates completing a variety of tasks including cutting different types of materials without multiple cutting blades and/or other pieces of cutting blade related equipment.

SUMMARY

An improved method of using a cutting blade on a portable band saw is provided which, according to an aspect of the disclosed subject matter, overcomes the deficiencies, disadvantages and drawbacks of using previously known portable band saw blades. The cutting blade has specific features that allow it to cut various materials, such as wood, ferrous metal, and/or non-ferrous metal and various ojects, such as pipe, structural members and the like. The method of using the portable band saw would cut various types of materials because the portable band saw blade is capable of cutting in a single continuous linear cut direction.

The improved method of using a cutting blade on a portable band saw includes the step of providing a portable band saw. A cutting blade is provided which includes at least one tooth having a linear rake face with a positive rake face angle transitioning uninterruptedly from a tip of said cutting tooth into a single radius to define a portion of said cutting tooth. The cutting blade is operatively mounted on the portable band saw. The portable band saw cuts an object with the cutting blade of the portable band saw in a single linear cut direction.

The method of using a cutting blade on a portable band saw includes the step of providing the cutting tooth has an area of about 0.0025 inch squared to about 0.0032 inch squared. The cutting tooth has a tip height from about 0.030 inches to about 0.060 inches. The positive rake angle includes an angle in the range of about 4 degrees to 8 degrees.

The improved method of using a cutting blade on a portable band saw also includes the step of providing the tooth may with a primary clearance surface having a primary relief angle. Adjacent to the primary clearance surface, the cutting tooth may have a secondary clearance surface with a secondary relief angle. The tooth may also include a tertiary clearance surface located adjacent to said secondary clearance surface with a tertiary clearance surface.

BRIEF DESCRIPTION OF THE DRAWINGS

The preferred embodiments of the present invention, illustrative of the best modes contemplated in applying the principles, are set forth in the following description and are shown in the drawings.

Similar numerals refer to similar parts throughout the drawings and description.

DESCRIPTION

The present invention is directed to an improved method of using a cutting blade on a portable band saw. The improved method of using the portable band saw would cut various types of materials because the portable band saw blade is capable of cutting in a single continuous linear cut direction. The cutting blade has specific features and characteristics that allow it to cut various materials and objects. The improved method of using a cutting blade on a portable band saw, according to at least one aspect of the present invention, includes the step of providing a portable band saw. A cutting blade is provided which includes at least one tooth. The cutting blade is operatively mounted on the portable band saw. The portable band saw cuts an object with the cutting blade of the portable band saw in a single continuous linear cut direction.

Figure 1:
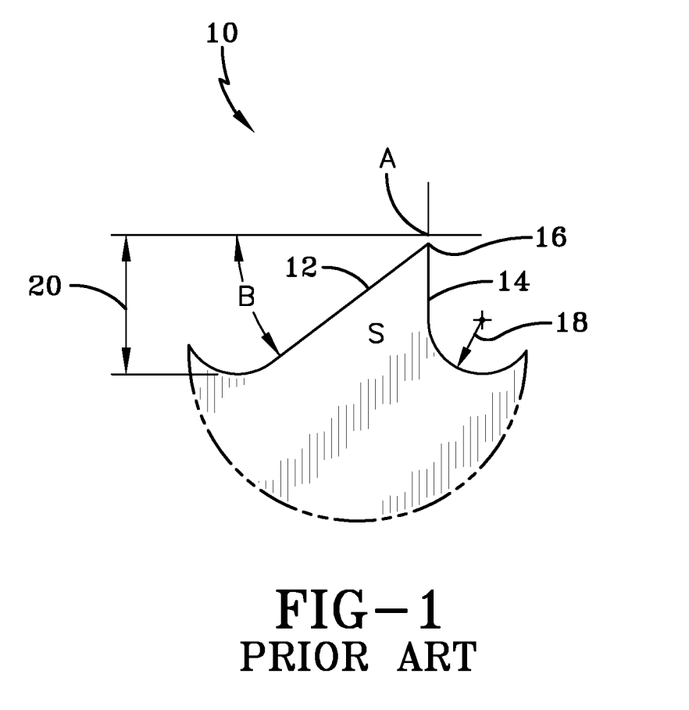
FIG. 1 is a side elevational view of a tooth of a cutting blade of a prior art cutting blade utilized on a portable cutting device.

In order to better understand the environment in which the method of using the cutting blade mounted on the portable band saw of the present invention is utilized, a cutting tooth that is typical of a prior art cutting blade for a portable band saw (not shown), is indicated generally as reference numeral 10 and shown in FIG. 1. The prior art cutting blade 10 now will be described in detail.

Prior art cutting tooth 10 is generally triangular in shape, as viewed in FIG. 1, and includes a primary clearance surface 12, a rake face 14, and a tip 16. Rake face 14 includes a rake angle as indicated by A. Rake angle A is generally zero (0) degrees as perpendicular to the length of cutting blade of the prior art. The low rake angle A slows the feed rate and inhibits the cutting blade's (not shown) tendency to climb the material being cut. Additionally, rake face 14 is defined by a radius 18 and is the area into which the chip curls when a cut is made. The radius 18 of rake face 14 ranges from about 0.01 inches to about 0.03 inches.

Primary clearance surface 12 has a primary acute relief angle B. The primary acute relief angle B ranges from about 0 degrees to about 35 degrees. Tip height 20 is the distance tooth 10 elevates above the body (not shown) of cutting blade of the prior art. Tip height 20 ranges in height from about 0.03 inches to about 0.06 inches. Prior art cutting tooth 10 generally has a thickness ranging from about 0.020 inches to about 0.025 inches. The thicker prior art cutting tooth 10 helps to minimize tooth stripping but increases material cost and operational costs. Prior art cutting tooth 10 of the prior art cutting blade for a portable band saw (not shown) generally includes an area S of about 0.001 inch squared to about 0.002 inch squared. As a result of a smaller area, cutting tooth 10 of the prior art cutting blade for a portable band saw is susceptible to tooth stripping and may require replacement frequently despite the increased thickness of the cutting tooth. Even further, the low rake angle facilitates a less aggressive cut undesirably increasing the cut time. Further, cutting tooth 10 of the prior art cutting blade for a portable band saw is limited to cutting specific types of materials.

Figure 2:
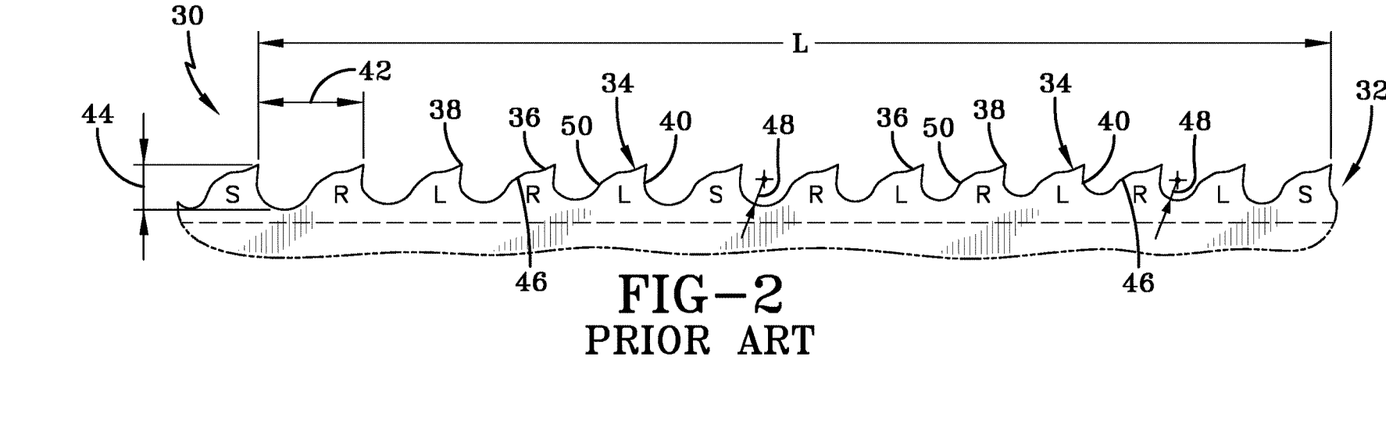
FIG. 2 is a side elevational view of a cutting blade of another prior art cutting blade utilized on an anchored and/or stationary cutting device.

Turning to FIG. 2, another prior art cutting blade is indicated, at reference numeral 30. Prior art cutting blade 30 is generally utilized on a band saw that is anchored and/or fixed to the ground and larger than a portable band saw (not shown). Cutting blade 30 includes a cutting edge 32 that includes a plurality of teeth 34. Cutting edge 32 is of a length L, along which teeth 34 extend, as will be described.

Figure 3:
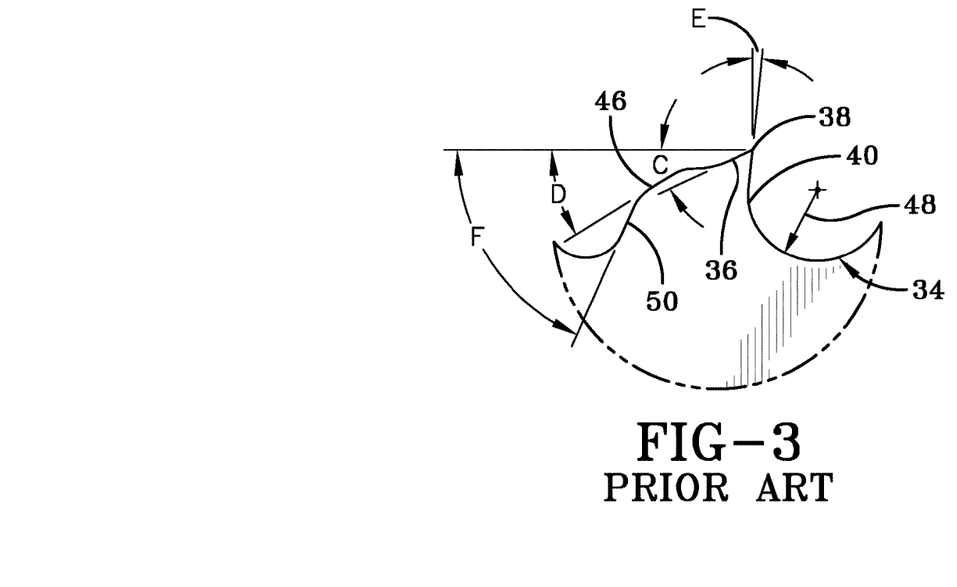
FIG. 3 is an enlarged view of a tooth of the prior art cutting blade of FIG. 2.

Turning to FIG. 2 and FIG. 3, plurality of teeth 34 include a primary clearance surface 36, a secondary clearance surface 46, a tertiary clearance surface 50, a tip 38, and a rake face 40. The distance between individual tips 38 is referred to as a pitch 42. Pitch 42 generally ranges from about 0.090 inches to about 0.135 inches. The distance plurality of teeth 34 elevates above body (not shown) of prior art cutting blade 30 is referred to as a tip height 44. Tip height 44 ranges in height from about 0.04 inches to about 0.06 inches.

As more clearly seen in FIG. 3, primary clearance surface 36 has a primary relief angle C measured from the longitudinal axis of tip 38 and is located opposite of rake face 40. Primary relief angle C ranges from about 23 degrees to about 27 degrees. Secondary clearance surface 46 includes a secondary relief angle D from the longitudinal axis of prior art cutting blade 30 and is located adjacent to primary clearance surface 36. Secondary relief angle D ranges from about 30 degrees to about 34 degrees.

On opposing side of primary clearance surface 36 and secondary clearance surface 46 is rake face 40. Rake face 40 protrudes from a perpendicular axis to the longitudinal axis of prior art cutting saw blade 30 at an angle of the rake face E. Rake face angle E ranges from about 4 degrees to about 8 degrees. Tertiary clearance surface 50 is adjacent to secondary clearance surface 46. Tertiary clearance surface 50 includes a tertiary angle F from the longitudinal axis of prior art cutting saw blade 30. Angle F ranges from about 64 degrees to about 68 degrees. Rake face 40 is defined by a radius 48 and is the area into which the chip curls when a cut is made. Radius 48 of rake face 40 ranges from about 0.03 inches to about 0.04 inches.

Figure 4:
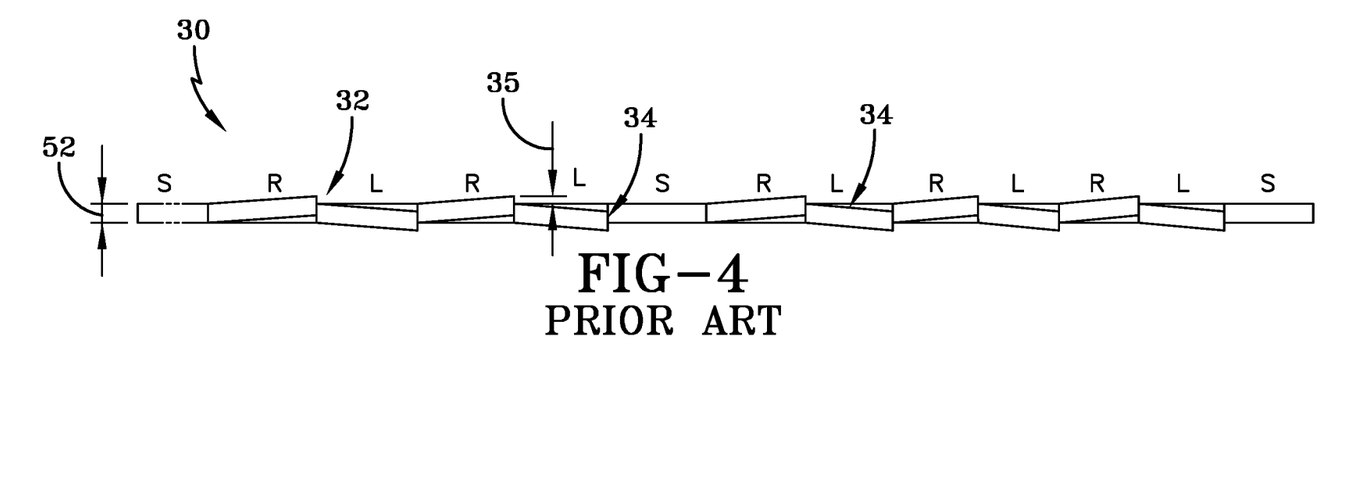
FIG. 4 is a top elevational view of the prior art cutting blade of FIG. 2.

Turning to FIG. 4, prior art cutting blade 30 is shown with the tooth set pattern known as a raker set. That is, there is a plurality of teeth 34 in a sequence with the first tooth neutral or in the plane of the body of prior art cutting blade 30, with a second tooth offset to the right of the blade, and a third tooth offset to the left of the blade, with a repeating pattern or some combination thereof.

The distance the tooth is offset from the body of prior art cutting blade 30 is known as a set magnitude 35. Set magnitude 35 generally ranges from about 0.007 inches to about 0.012 inches. Prior art cutting blade 30 includes a thickness 52 that ranges from about 0.018 inches to about 0.063 inches.

The use of prior art cutting blade 30 has been limited to only being utilized on anchored and/or stationary band saws as a result of the cutting blade's fine tooth pitch, in accordance with industry standard of maintaining a specified number of cutting teeth in the object being cut. As a result, there is a need in the art for a cutting blade that overcomes the disadvantages of the prior art cutting blades described above. The cutting blade and method of using the cutting blade of the present invention satisfies this need, as will be described below.

The present invention method of using a cutting blade includes a cutting blade that cuts in a single continuous linear cut direction. The cutting blade is installed on a portable band saw that unexpectedly operates effectively and/or better than prior art cutting blade tooth 10 utilized on a portable band saw. More specifically, the method of utilizing a cutting blade of the present invention minimizes tooth stripping thus maintaining and/or increasing the life of the saw blade minimizing costs. Further, the method of using a cutting blade of the present invention provides easy transportability to various locations as determined by the user as a result of the ability of the cutting blade to be installed on portable band saws, allowing a user to cut a greater variety of materials than previous portable band saw cutting blades. Moreover, the method of using a cutting blade of the present invention allows for a positive rake angle facilitating faster cut times. The method of using a cutting blade provides these advantages by installing a cutting blade that previously was limited to anchored and/or stationary band saws on a portable band saw.

Figure 5:
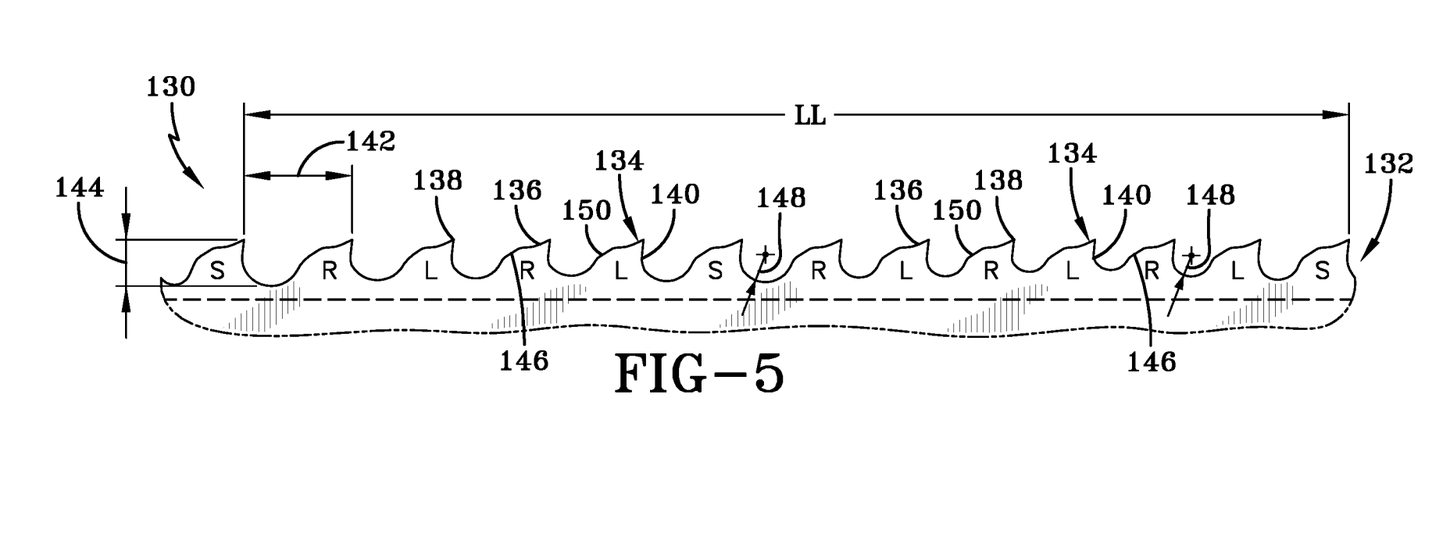
FIG. 5 is a side elevational view of a cutting blade of a first embodiment cutting blade utilized on a portable band saw.

A first exemplary embodiment of a cutting blade utilized in a method of using a cutting blade of the present invention is shown in FIG. 5, at reference numeral 130. Cutting blade 130 has been installed onto a portable band saw (not shown) and unexpectedly produced advantageous results, as will be described below.

The first exemplary embodiment cutting blade 130 includes a cutting edge 132 that includes a plurality of teeth 134. First embodiment cutting blade 130 is generally composed of a metal such as an alloy or several alloyed metals. Cutting edge 132 is of a length LL, along which teeth 134 extend, as will be described. Plurality of teeth 134 include a primary clearance surface 136, a secondary clearance surface 146, a tip 138, and a rake face 140. The distance between individual tips 138 is referred to as a pitch 142. Pitch 142 ranges from about 0.090 inches to about 0.135 inches. The distance plurality of teeth 134 elevates above body (not shown) of cutting blade 130 is referred to as a tip height 144. Tip height 144 ranges in height from about 0.035 inches to about 0.065 inches. Preferably, tip height 144 is about 0.05 inches.

Figure 6:
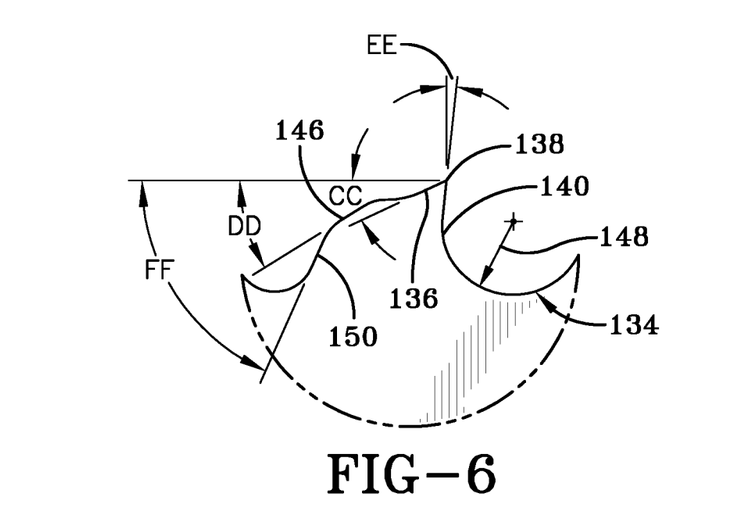
FIG. 6 is an enlarged view of a tooth of the first embodiment cutting blade shown in FIG. 5.

As more clearly shown in FIG. 6, primary clearance surface 136 has a primary relief angle CC from the longitudinal axis of cutting blade 130 and is located opposite of rake face 140. Primary relief angle CC ranges from about 22 degrees to about 27 degrees. Preferably, primary relief angle CC is about 25 degrees.

Secondary clearance surface 146 is a radius and includes a secondary relief angle DD with a longitudinal axis of cutting blade 130 and is located adjacent to primary clearance surface 136. The radius of secondary clearance surface 146 ranges from about 0.020 inches to about 0.025 inches. The radius of secondary clearance surface 146 is preferably about 0.022 inches. Secondary relief angle DD ranges from about 30 degrees to about 35 degrees. Preferably, secondary relief angle DD is about 32 degrees.

Tertiary clearance surface 150 is adjacent to secondary clearance surface 146. Tertiary clearance surface 150 includes a tertiary angle FF. Angle FF ranges from about 64 degrees to about 68 degrees. Angle FF is preferably about 66 degrees. The larger tertiary angle FF provides less friction between the cutting blade 130 of the present invention and the object being cut. Additionally, the reduced friction maintains a lower temperature around cutting blade 130 of the present invention generally minimizing heat degradation.

On opposing side of primary clearance surface 136, secondary clearance surface 146, and tertiary clearance surface 150 is rake face 140. Rake face 140 protrudes from a perpendicular axis to the longitudinal axis of cutting blade 130 at an angle of rake face EE. Rake face angle EE ranges from about 4 degrees to about 8 degrees. Preferably, rake face angle EE is about 6 degrees. Positive rake face angle EE' facilitates faster cuts and maintains durability thus reducing tooth stripping.

Rake face 140 is defined by a linear or planar surface extending from tip 138 to tangent with radius 148. The void defined by radius 148 is the area into which the chip curls when a cut is made. Radius 148 of rake face 140 ranges from about 0.020 inches to about 0.040 inches. Preferably, radius 148 is about 0.030 inches.

The area of tooth 134 ranges from about 0.0025 inch squared to about 0.0032 inch squared. The area of tooth 134 is preferably about 0.0029 inch squared. The surface area of a cutting tooth is bound horizontally by the front face and back surfaces of the tooth. The front of the tooth is in reference to the rake face 140, and the back surface of the tooth is in reference to the primary, secondary, and tertiary clearance surfaces 136, 146, 150. The surface area of a tooth is bound vertically by the tip of the tooth and the upper edge of the body of the cutting blade.

The area of tooth 134 is greater than the area of prior art cutting tooth 10 for a portable cutting device thus providing more robustness and/or durability thus minimizing tooth stripping. Additionally, as a result of less tooth stripping, cutting blade 130 does not require replacement as frequently thus minimizing costs. Further, the more robust cutting tooth 134 is capable of cutting multiple different materials, such as wood, ferrous metal, and/or non-ferrous metal, and objects such as pipe, structural members and the like known to those skilled in the art. In this manner, cutting blade 130 may cut multiple different materials with the same cutting blade without interchanging the cutting blade thus saving time.

Figure 7:
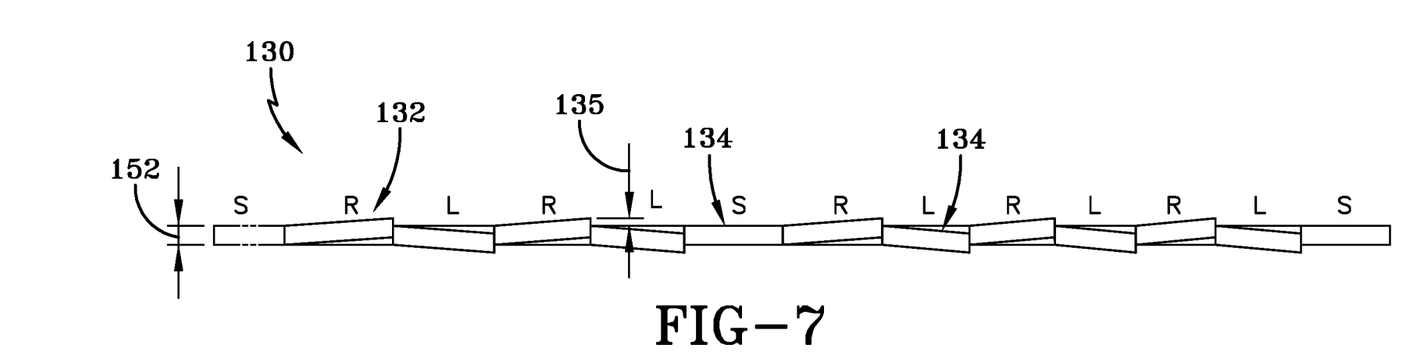
FIG. 7 is a top elevational view of the first embodiment cutting blade of FIG. 5.

Turning to FIG. 7, first exemplary embodiment cutting blade 130 is shown with the tooth set pattern known as a raker set. That is, there is a plurality of teeth 134 in a sequence with the first tooth neutral or in the plane of the body of first embodiment cutting blade 130, with a second tooth offset to the right of the blade, and a third tooth offset to the left of the blade, with a repeating pattern or some combination thereof.

The distance the tooth is offset from the body of first embodiment cutting blade 130 is known as a set magnitude 135. Set magnitude 135 generally ranges from about 0.007 inches to about 0.012 inches. Preferably, set magnitude 135 is about 0.009 inches.

As more clearly shown in FIG. 7, first embodiment cutting blade 130 includes a thickness 152 in a range from about 0.018 inches to about 0.030 inches. The decreased thickness 152 of cutting blade 130 of the present invention provides a cost and performance advantage of prior art cutting blades. Moreover, the larger area of tooth 134 compared to prior art cutting tooth 10 provides durability/robustness thus reducing tooth stripping. Additionally, the larger area of tooth 134 facilitates a positive rake angle EE thus enabling faster cutting times. Even further, the more robust cutting tooth 134 allows for first embodiment cutting blade 130 to be used to cut various materials in a single linear cut direction, such as wood, ferrous metal, and/or non-ferrous metal, and objects such as pipe, structural members and the like known to those skilled in the art. Moreover, first embodiment cutting blade 130 includes a pitch that is contrary to industry standard for portable cutting devices which dictates a finer pitch. Further, industry standard teaches that the tooth pitch required to cut various materials, including wood, ferrous metal, and/or non-ferrous metal, and objects such as pipe or structural members, would be too coarse for a portable band saw. As a result, cutting blade 130 would not be utilized on portable band saws as a result of the industry standard.

The first embodiment cutting blade 130 minimizes the problems associated with prior art cutting tooth 10 by increasing the area of cutting tooth 134. The increased area of cutting tooth 134 provides durability and/or robustness thus minimizes tooth stripping and minimizes the frequency of replacing first embodiment cutting blade 130. In this manner, costs associated with replacing cutting blade 130 are reduced. Additionally, the increased area of cutting tooth 134 facilitates a positive rake angle EE that provides faster cut times. Moreover, cutting blade 130 of the present invention is utilized on portable band saws to cut various materials such as wood, ferrous metal, and/or non-ferrous metal, and objects such as pipe, structural members and the like known to those skilled in the art. As a result, fewer portable cutting devices are required thus further minimizing costs.

Figure 8:
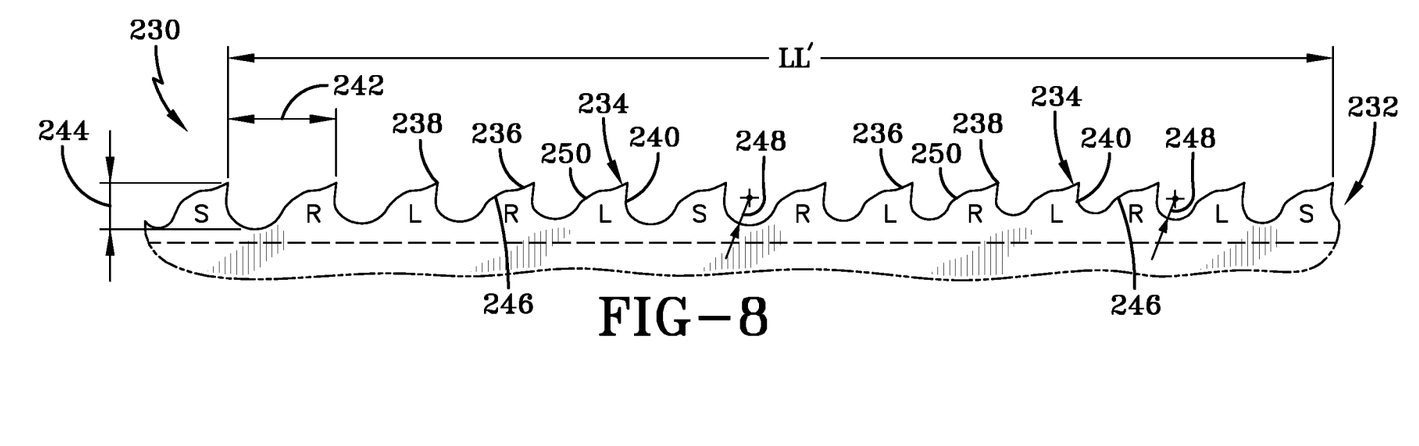
FIG. 8 a side elevational view of a cutting blade of a second embodiment cutting blade utilized on a portable band saw.

Turning to FIG. 8, a second exemplary embodiment of a cutting blade utilized in a method of using a cutting blade of the present invention is shown at reference numeral 230. Cutting blade 230 was installed onto a portable band saw (not shown) and unexpectedly produced advantageous results, as will be described below.

The second exemplary embodiment method includes cutting blade 230 with a cutting edge 232 that includes a plurality of teeth 234. Second embodiment cutting blade 230 is generally composed of a metal such as an alloy or a combination of alloyed metals. Cutting edge 232 is of a length LL', along which teeth 234 extend, as will be described.

Plurality of teeth 234 include a primary clearance surface 236, a secondary clearance surface 246, a tip 238, and a rake face 240. The distance between individual tips 238 is referred to as a pitch 242. Pitch 242 ranges from about 0.065 inches to about 0.085 inches. Pitch 242 is shorter than pitch 142 to allow for a higher TPI for second embodiment cutting blade 230. The distance plurality of teeth 234 elevates above body (not shown) of cutting blade 230 is referred to as a tip height 244. Tip height 244 ranges in height from about 0.027 inches to about 0.040 inches. Preferably, tip height 244 is about 0.035 inches.

Figure 9:
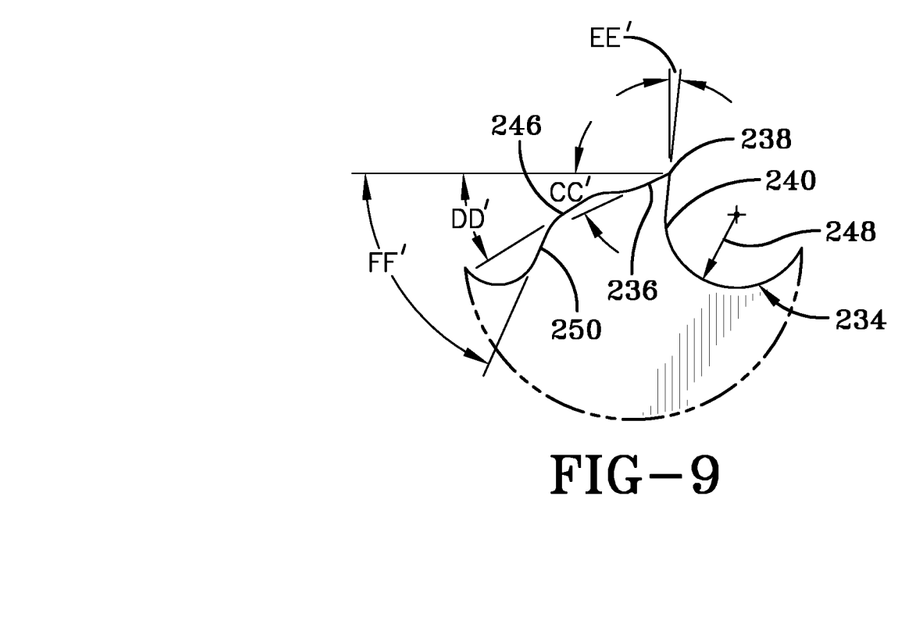
FIG. 9 is an enlarged view of a tooth of the second embodiment cutting blade shown in FIG. 8.

Primary clearance surface 236 has a primary relief angle CC' from the longitudinal axis of tip 238 and is located opposite of rake face 240. Primary relief angle CC' ranges from about 23 degrees to about 27 degrees. Preferably, primary relief angle CC' is about 25 degrees.

Secondary clearance surface 246 includes a secondary relief angle DD' with a longitudinal axis of cutting blade 230 of portable device (not shown) and is located adjacent to primary clearance surface 236. Secondary relief angle DD' ranges from about 30 degrees to about 35 degrees. Preferably, secondary relief angle DD' is about 32 degrees.

Tertiary clearance surface 250 is adjacent to secondary clearance surface 246. Tertiary clearance surface 250 includes a tertiary angle FF'. Angle FF' ranges from about 43 degrees to about 48 degrees. Angle FF' is preferably about 45 degrees. A smaller tertiary angle FF' provides more area/mass/strength to cutting tooth 234 facilitating a positive rake face angle EE', as will be described below.

Second embodiment cutting blade 230 has a smaller tertiary angle FF' than first exemplary embodiment 130. This is a result of maintaining sufficient space between tip height 244 of adjacent teeth 234 to clear the material after it has been cut.

On opposing side of primary clearance surface 236, secondary clearance surface 246, and tertiary clearance surface 250 is rake face 240. Rake face 240 protrudes from a perpendicular axis to the longitudinal axis of cutting blade 230 at angle of the rake face EE'. Rake face angle EE' ranges from about 4 degrees to about 7 degrees. Preferably, rake face angle EE' is about 6 degrees. Positive rake face angle EE' facilitates faster cuts and maintains durability thus reducing tooth stripping.

Rake face 240 is defined by a linear or planar surface extending from tip 238 to tangent with radius 246. The void defined by radius 248 is the area into which the chip curls when a cut is made. Radius 248 of rake face 240 ranges from about 0.012 inches to about 0.018 inches. Preferably, radius 248 is about 0.015 inches.

The area of tooth 234 ranges from about 0.001 inches squared to about 0.0018 inches squared. By increasing the area of the tooth 234 and having radius 248 ranging from about 0.012 inches to about 0.018 inches, a positive rake face angle EE' is achieved. Positive rake face angle EE' provides for faster cuts and maintains robustness and/or durability thus minimizing tooth stripping. Moreover, the larger area of tooth 234 compared to prior art cutting tooth 10 provides reduced tooth stripping. Further, the more robust cutting tooth 234 is capable of cutting multiple different materials, such as wood, ferrous metal, and/or non-ferrous metal, and objects such as pipe, structural members and the like known to those skilled in the art.

Figure 10:
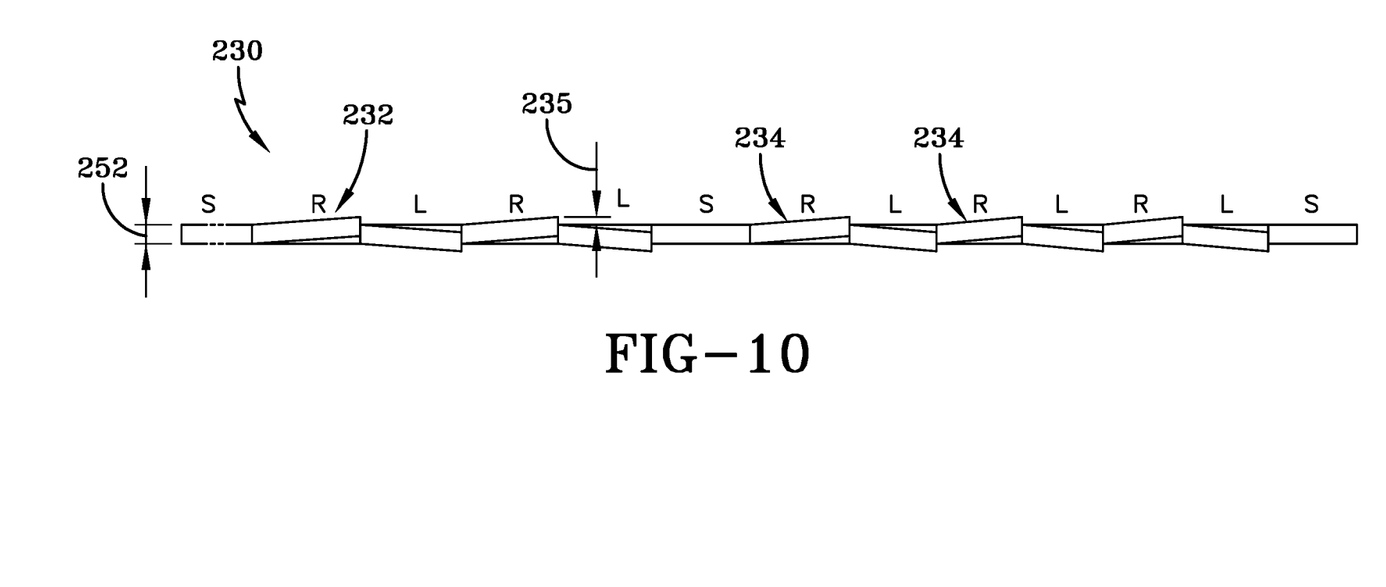
FIG. 10 is a top elevational view of the second embodiment cutting blade of FIG. 8.

Turning to FIG. 10, second exemplary embodiment cutting blade 230 is shown with the tooth set pattern known as a raker set. That is, there is a plurality of teeth 234 in a sequence with the first tooth neutral or within the plane of the body of second embodiment cutting blade 230, with a second tooth offset to the right of the blade, and a third tooth offset to the left of the blade, with a repeating pattern or some combination thereof.

The distance the tooth 234 is offset from the body of second embodiment cutting blade 230 is known as a set magnitude 235. Set magnitude 235 generally ranges from about 0.007 inches to about 0.012 inches. Preferably, set magnitude 235 is about 0.009 inches.

As more clearly shown in FIG. 10, is a thickness 252 of second embodiment cutting blade 230. Thickness 252 ranges from about 0.018 inches to about 0.025 inches. The decreased thickness 252 of cutting blade 230 of the present invention provides a reduced cost as a result of utilizing less material in construction of the cutting blade. Moreover, cutting blade 230 of the present invention is more durable and/or robust despite thickness 252.

The second embodiment cutting blade 230 minimizes the problems associated with prior art cutting tooth 10 by increasing the area of cutting tooth 234. The increased area minimizes tooth stripping and minimizes the frequency of changing cutting blade 230 of the second embodiment. Further, the larger area of tooth 234 facilitates a positive rake angle EE' thus enabling faster cutting times. Moreover, cutting blade 230 of the present invention may be utilized on portable band saws to cut various materials in a single linear cut direction, including wood, ferrous metal, and/or non-ferrous metal, and objects such as pipe, structural membersand the like known to those skilled in the art, with the same cutting blade 230.

The method of utilizing first or second embodiment cutting blade 130, 230 of the present invention includes providing a portable band saw, providing the cutting blade, using the portable band saw with the installed cutting blade to cut an object, and cutting the material in a single continuous linear cut direction with the portable band saw. More specifically, first and second embodiments cutting blade 130, 230 of the present invention are preferably cutting blades for a portable band saw.

The method of utilizing first and second embodiment cutting blade 130, 230 of the present invention has realized unexpected results in the art. Industry standard has heretofore dictated to try to have a specific amount of cutting teeth in the material being cut at all time. As a result of the industry standard, size of the cutting teeth is limited such that the industry standard of maintaining a specific number of teeth in the object being cut is satisfied. Additionally, as a result of the industry standard, use of prior art cutting blade 30 has been limited to anchored and/or stationary band saws to satisfy the industry standard.

In the portable cutting device market, manufacturers had to compensate for being outside the range of the industry standard of having a specific number of cutting teeth in the material being cut by adjusting the structure of the cutting blade and/or cutting teeth. In this manner, portable cutting blade manufacturers generally utilize fine pitched cutting blades and a zero degree rake angle to maintain the industry standard and to further attempt to minimize tooth stripping.

Despite the industry standard described above, when first and second embodiment cutting blades 130, 230 were employed on a portable band saw, unexpected results were realized. More specifically, cutting blades 130, 230 include cutting teeth 134, 234 with a coarser pitch compared to the portable cutting device industry standard range. In this manner, the area of cutting teeth 134, 234 minimizes tooth stripping thus increasing the life of blades 130, 230. Moreover, rake face angle EE, EE' may be given a positive value as a result of increasing the area of tooth 134, 234, leading to faster cut times compared to industry standard. Additionally, positive rake angle EE, EE' allow for first and second embodiment cutting blades 130, 230 to be used to cut various materials, including wood, ferrous metal, and/or non-ferrous metal, and objects such as pipe or structural members and the like known to those skilled in the art with the same cutting blade. In this manner, it was discovered that the same portable band saw could cut different types of materials utilizing first and second embodiment cutting blades 130, 230 despite being contrary to industry standard. Further, first and second embodiment cutting blades 130, 230 minimize the amount of tooth stripping thus prolonging the life of the cutting blades and thus minimizing costs, when compared to portable band saw with different cutting blades and/or cutting teeth such as prior art cutting tooth 10.

The method of using a cutting blade of the present invention includes a blade that is thinner than prior art cutting blades for anchored and/or stationary band saws as dictated by industry standard. The reduced material for first and second embodiment cutting blades 130, 230 provides a cost and performance advantage. Moreover, tooth 134, 234 includes a coarser pitch allowing the tooth to have a larger area and to have a positive rake face angle EE, EE' than prior art portable cutting devices cutting tooth 10 facilitating faster cutting times. As a result of the coarser pitch, tooth stripping is minimized and the life of cutting blade 130, 230 is prolonged thus minimizing replacement of the blades and associated costs with replacing the blades. In addition, the method of using a cutting blade of the present invention provides the ability to cut different types of materials, including wood, ferrous metal, and/or non-ferrous metal, and objects such as pipe or structural members on a single portable band saw without using additional and/or different cutting blades on different portable cutting devices, which saves time by avoiding the need to change blades or portable cutting devices, and the cost of purchasing specific blades for each material to be cut.

It is to be understood that the structure and the method of the above-described method of using a cutting blade of the invention 130, 230, may be altered without affecting the overall concept or operation of the present invention. For example, first and second embodiment cutting blade 130, 230 may include different tooth set patterns known by a person of ordinary skill in the art, and the first and second embodiment cutting blade may be constructed out of other types of materials other than those listed without affecting the overall concept or operation of the present invention.

Moreover, values outside of the exemplary ranges presented above may be employed without affecting the overall concept or operation of the present invention. For example, area of tooth 134, 234 may include an area outside of the range listed, pitch 142, 242 may include a distance outside of the range listed, and tip height 144, 244 may include a height outside of the range listed without affecting the overall concept or operation of the present invention. In addition, primary relief angle CC, CC', secondary relief angle DD, DD', and/or rake face angle EE, EE' may include an angle outside of the range listed without affecting the overall concept or operation of the present invention. Moreover, rake face 140, 240 may include a radius outside of the range listed, and/or set magnitude 135, 235 may include a distance outside of the ranges listed, without affecting the overall concept or operation of the present invention.

Accordingly, the method of using a cutting blade is simplified, provides an effective, safe, inexpensive and efficient method which achieves all the enumerated objectives, provides for eliminating difficulties encountered with prior art cutting methods for portable cutting devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the method of using a cutting blade is used and installed, the characteristics of the construction, arrangement and method steps, and the advantageous, new and useful results obtained; the new and useful elements, arrangements, process, parts and combinations are set forth in the appended claims.

What is claimed is:

1. A method of using a cutting blade on a portable band saw, the method comprising the steps of:

providing said portable band saw;

providing said cutting blade on said portable band saw, wherein the cutting blade includes a plurality of sets of teeth, each set including at least one neutral tooth, one right set tooth, and one left set tooth, each tooth in the set having a linear rake face with a positive rake face angle in the range of 4 degrees to 8 degrees transitioning uninterruptedly from a tip of said tooth into a single radius ranging within the range from 0.020 inches to 0.040 inches to define a portion of said tooth and the at least one tooth has an area of 0.0025 inches squared to 0.0032 inches squared, said cutting blade having a thickness between 0.018 inches and 0.030 inches, and the set magnitude of the set teeth is between 0.007 inches and 0.012 inches, where every tooth in each set has a tip height from 0.030 inches to 0.060 inches, has a primary clearance surface having a primary relief angle, in the range of 22 degrees to 27 degrees from a line between adjacent tips of said cutting blade, has a secondary clearance surface arcuate with a radius in the range from 0.020 inches to 0.025 inches and having a secondary relief angle in the range of 30 degrees to 35 degrees from a line between adjacent tips of said cutting blade, the secondary clearance surface located adjacent to said primary clearance surface, has a tertiary clearance surface located adjacent to said secondary clearance surface, and has a tip pitch of 0.090 inches to 0.135 inches;

using the portable band saw to cut a first object of a first material with the cutting blade, where the first material is one of wood or metal; and cutting the first object with the cutting blade of the portable band saw in a single continuous linear cut direction, and using the portable band saw to cut a second object of a second material with the cutting blade, where the second material is the other of wood or metal; and cutting the second object with the cutting blade of the portable band saw in a single continuous linear cut direction.

2. The method of using a cutting blade on a portable band saw of claim 1, wherein said tertiary clearance surface is at an angle in the range of 43 degrees to 48 degrees.

3. The method of using a cutting blade on a portable band saw of claim 1, wherein said tertiary clearance surface is at an angle in the range of 64 degrees to 68 degrees.

* * * * *